Oct. 27, 1970     J. J. BUNDSCHUH ET AL     3,536,276
CARTRIDGE FOR REEL OF STRIP MATERIAL
Filed June 5, 1967     3 Sheets-Sheet 2
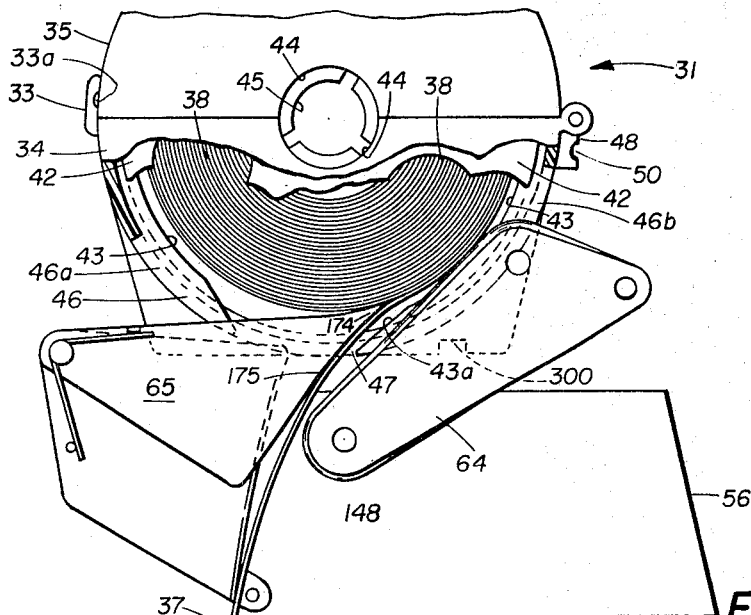
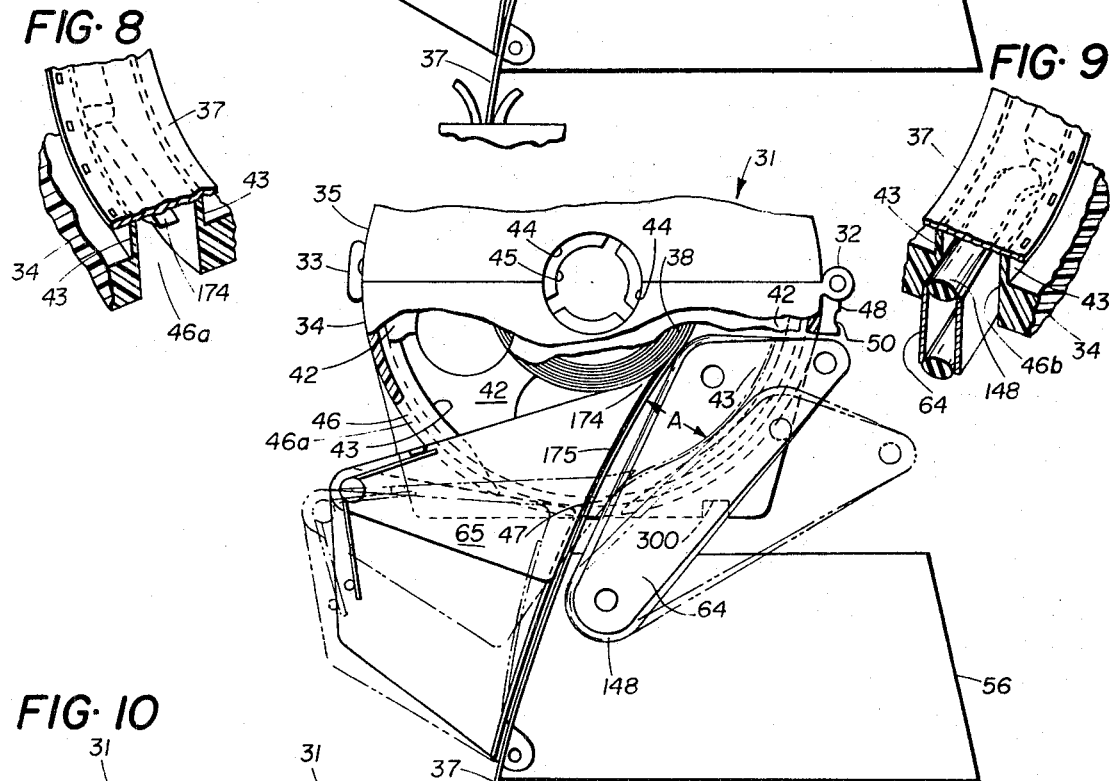
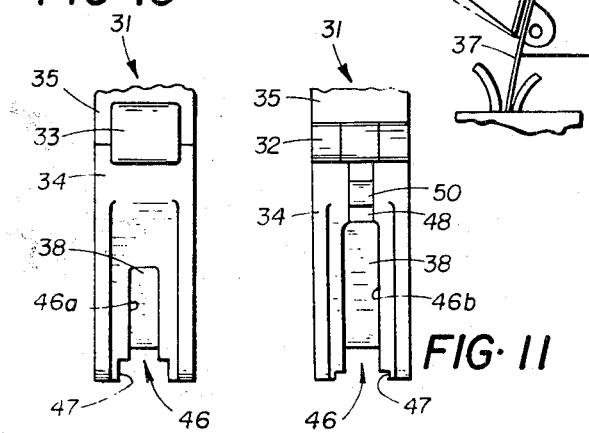
JOHN J. BUNDSCHUH
KENNETH W. THOMSON
INVENTORS
BY Malcolm F. Dunn
Robert W. Hampton
ATTORNEYS

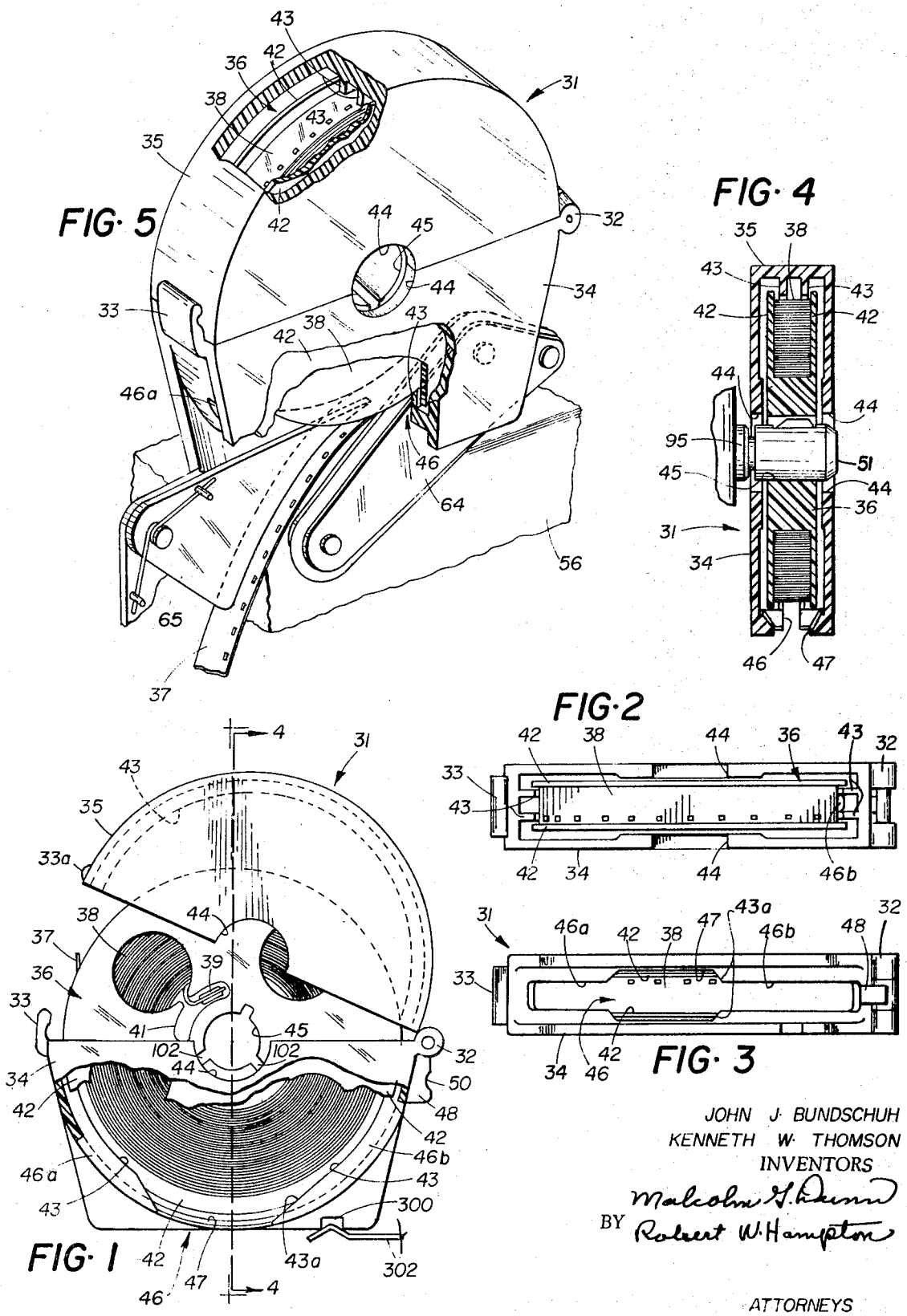

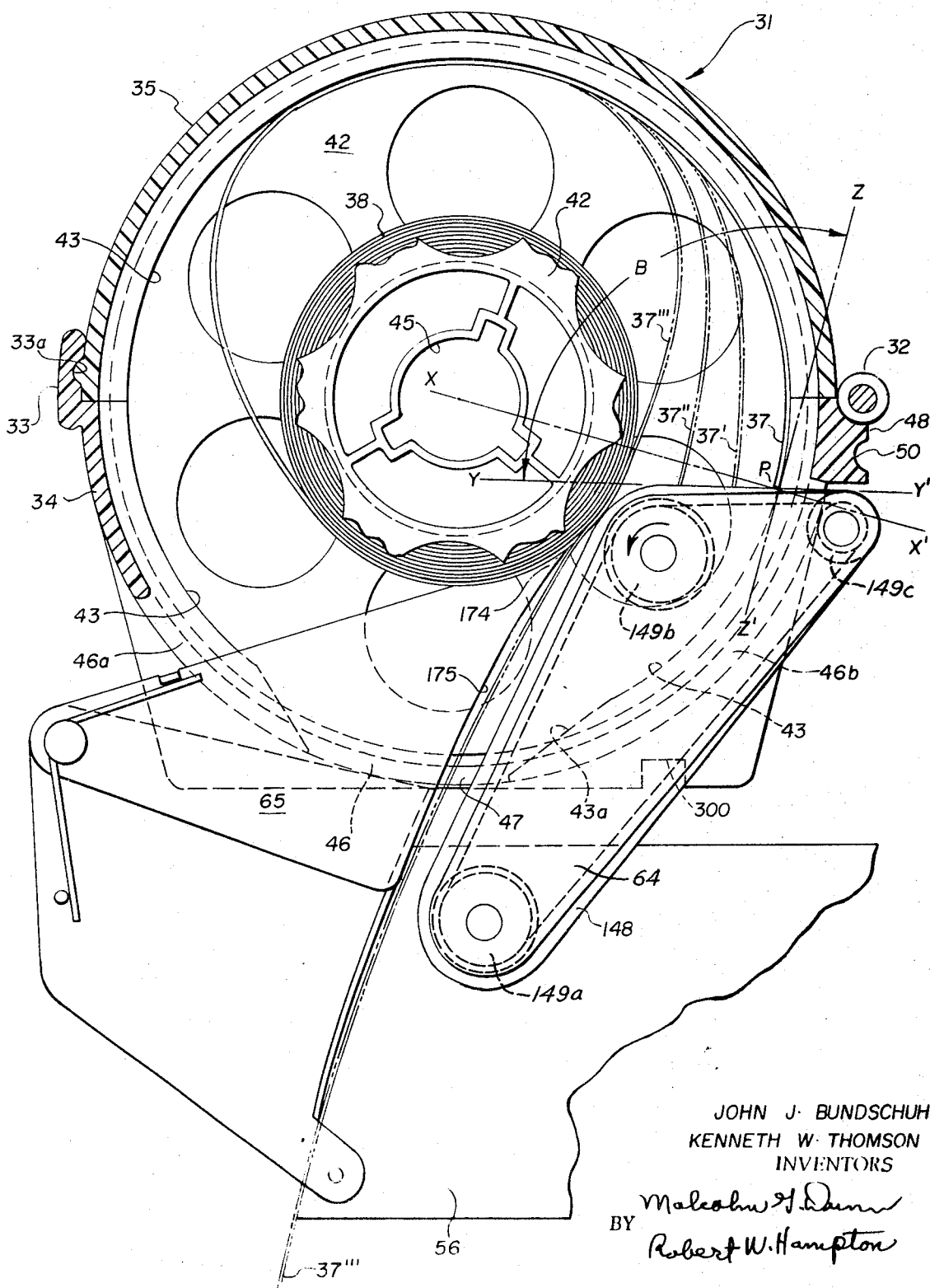

United States Patent Office 3,536,276
Patented Oct. 27, 1970

3,536,276
CARTRIDGE FOR REEL OF STRIP MATERIAL
John J. Bundschuh and Kenneth W. Thomson, Rochester, N.Y., assignors to Eastman Kodak Company, Rochester, N.Y., a corporation of New Jersey
Filed June 5, 1967, Ser. No. 643,503
Int. Cl. G11b 15/32, 23/08
U.S. Cl. 242—192
10 Claims

ABSTRACT OF THE DISCLOSURE

For use on an apparatus, such as a cinematographic projector, a cartridge for receiving a reel of strip material and for cooperating with a film stripping mechanism on the apparatus. The cartridge defines a chamber having rail means that relatively confine the reel to the central area of the chamber and which confine and guide the outer convolution of strip material on the reel, and cooperate with the stripping mechanism of the apparatus so that a leader of the strip material may be moved out of the cartridge. The film stripping mechanism includes a generally triangular shaped endless drive belt that is selectively positionable within the cartridge for engaging the strip material and driving the roll in an unwinding direction.

CROSS-REFERENCES TO RELATED APPLICATIONS

Reference is made to commonly assigned U.S. Pat. application Ser. No. 643,502, entitled "Cinematographic Cartridge Projector Apparatus," filed June 5, 1967 in the name of John J. Bundschuh, Robert J. Roman and Kenneth W. Thomson; and commonly assigned U.S. Pat. 3,429,518 issuing on application Ser. No. 706,703, entitled "Automatic Film Stripper," filed Feb. 19, 1968, in the name of Edward S. McKee, which was a continuation of application Ser. No. 470,499, filed July 8, 1965.

BACKGROUND OF THE INVENTION

The present invention relates to a housing for a roll of strip material for insertion on and removal from an apparatus, such as a cinematographic projector, and particularly to a cartridge for receiving and loosely containing in its chamber a reel of strip material that will be supported by a spindle of the apparatus when the cartridge is inserted on such apparatus.

A cartridge capable of receiving and loosely containing a reel of strip material for use on an apparatus, such as a cinematographic projector, whereby the reel will be supported by a spindle of the apparatus when the cartridge is detachably connected to the apparatus is disclosed in commonly assigned U.S. applications Ser. Nos. 591,153, entitled "Film Guide Edges on Projection Cartridge," filed in the name of Leslie J. Bunting on Nov. 1, 1966, now U.S. Pat. No. 3,451,636; 591,248, entitled "Rim Trap For Photographic Film Projection Cartridge," filed in the name of Robert J. Roman on Nov. 1, 1966, now U.S. Pat. No. 3,467,341; and 591,249, entitled "Projection Cartridge," filed in the name of Robert J. Roman on Nov. 1, 1966, now U.S. Pat. No. 3,480,226. Such cartridge has a peripheral edge surface bordering an opening in one wall of the cartridge that is of lesser diameter than the diameter of the leading flange of the reel to be received into the cartridge chamber so that it is necessary to urge the leading flange of the reel past such edge surface until the flange snaps through the opening with the result that such edge surface loosely retains the reel within the cartridge chamber.

In commonly assigned U.S. application Ser. No. 591,235, entitled "Strip Material Storage and Feed Arrangement," filed in the name of Norman J. Rosenbugh on Nov. 1, 1966, now U.S. Pat. No. 3,467,340, another construction of a protective housing for a reel of strip material is disclosed. This housing or "magazine" includes an inner annular flange that has a diameter less than the diameter of the flanges of the reel to be received, and a width less than the distance between the reel flanges. Since the reel flanges are formed of yieldable material the reel flange is flexed past the magazine flange so that the reel may be inserted in the protective housing, and the flange thus serves to retain the reel in the housing. The reel flanges are compressed at a predetermined location by suitable mechanism on the apparatus on which the housing or magazine is installed for operation with the result that the outer strip material convolution is gradually urged radially outwardly through an exit throat and out of the magazine through an exit aperture in the outer periphery of the magazine. The annular flange has a guide surface against which the outer strip material convolution is urged into contact as a result of such reel flange compression, and then is guided therealong to pass into the exit throat and out the exit aperture. The outer convolution of the strip material is thus guided and supported at its edges by the reel flanges which are compressed thereagainst, and the uppermost surface of the outer convolution of strip material is guided by the flange surface which contacts the strip material centrally of its information area.

In commonly assigned U.S. Pat. 3,429,518, mechanisms are disclosed for moving the leader portion of a roll of film mounted on the apparatus from the roll to the self-threading guide mechanism or track of a projector. A stripper mechanism is selectively biased against the outer surface of the roll to pick up and initially guide the leader portion to a guide track of the projector. A surface drive belt mechanism is positioned adjacent the stripper for rotating the roll to initiate the stripping action. The stripper mechanism and the surface drive belt mechanism form between them when selectively biased against the roll mating surfaces of a passageway to guide the film leader to the self-threading guide mechanism or track of the projector.

SUMMARY OF THE INVENTION

An object of the present invention, therefore, is to provide a cartridge of the type described above wherein the reel is loosely contained within the cartridge chamber so as to be supported by the apparatus spindle when the cartridge is inserted on the apparatus, and in which the guide means for the outer convolutions of strip material are rail means that serve to restrain the reel from contacting the chamber wall surfaces; to confine the clockspringing of the strip material convolutions within the circumference of the reel flanges; to cooperate with and guide the pick-up and drive mechanisms of the apparatus as such mechanisms extend through openings in the chamber wall and into engagement with the outer convolution of strip material; to prevent the convolutions on the reel from buckling to one side when engaged on the other side by the pick-up and drive mechanisms, and to guide the outer convolution of strip material until it is deflected by the pick-up mechanism for movement into the channel formed between the pick-up and drive mechanisms and out of the cartridge through the chamber wall opening.

Another object is to provide such a cartridge as described above wherein the rail means adjacent the openings in the chamber wall cooperate with the pick-up and drive mechanisms, when the latter movably extend through the openings, to form between the mechanisms and the cartridge an enclosed channel by which the leader of the strip material is moved out of the cartridge to the apparatus. A further object of the invention is to provide an improved mechanism for removing a length of strip material from a roll of such material even if the leading end of the strip material clocksprings away from the axis of rotation of the roll.

Other objects inherent in the character of the invention will be apparent to those skilled in the art from the following detailed description of an illustrative preferred embodiment thereof, reference being made to the accompanying drawings in which like numerals denote like elements and in which:

FIG. 1 is an elevational view of a clamshell cartridge with its cover partially open to show a reel of strip material disposed therein, and with a portion of the cartridge broken away to show the taper of the guide rails adjacent an opening in the bottom of the cartridge, and a code notch formed in the bottom of the cartridge being detected by a detector finger of an apparatus;

FIG. 2 is a top plan view of the cartridge shown in FIG. 1 with the top half of the cartridge removed;

FIG. 3 is a bottom plan view of the cartridge shown in FIGS. 1 and 2 illustrating the openings through which the strip material drive mechanism and the pick-up mechanism of the apparatus may extend and the strip material may pass out of and into the cartridge;

FIG. 4 is a cross-sectional view of the cartridge and reel of strip material taken along line 4—4 of FIG. 1 and illustrating the engagement of and support by the rotatable head portion of an apparatus spindle member with the reel;

FIG. 5 illustrates a perspective view of the cartridge and a portion of an apparatus with its pick-up and drive mechanisms extending through the openings in the bottom of the cartridge into engagement with the roll of strip material;

FIG. 6 is an elevational view of the cartridge and the apparatus with a portion of the cartridge broken away to illustrate the positions assumed by the pick-up and drive mechanisms with a relatively full roll of strip material on the reel;

FIG. 7 is a view similar to FIG. 6 and illustrating the positions assumed by the pick-up and drive mechanisms when the initial amount of strip material on the reel is considerably less than the possible capacity of the reel, and further illustrating the possible range of tangential paths within which the leader of strip material may follow when initially guided out of the opening in the bottom of the cartridge;

FIG. 8 is a perspective view of a portion of the cartridge in cross-section and through an opening in the bottom of the cartridge illustrating the relative positions of the pick-up mechanism and the guide rails;

FIG. 9 is a perspective view of a portion of the carridge in cross-section through an opening in the bottom of the cartridge illustrating the relative positions of the drive mechanism and the guide rails;

FIG. 10 is a partial side elevational view of the cartridge illustrating the latch side and the position of the openings through which the pick-up mechanism will extend;

FIG. 11 is a partial side elevation view of the cartridge illustrating the hinge side and the position of the openings through which the drive mechanism will extend; and FIG. 12 is an enlarged view similar to FIG. 7 and illustrating the leader of the strip material being "walked" over to the coil of strip material for subsequent movement out of the cartridge.

The cartridge, shown generally at 31, is preferably in the form of a clamshell housing having a lower casing member 34 and an upper casing member 35 that may be suitably connected to the lower casing member by hinge 32. The upper and lower casing members may be releasably held together by latch member 33, the latter being affixed to the lower casing member for locking cooperation with abutment 33a on the upper casing member. In this manner the cartridge may be readily loaded and unloaded. Upon opening the clamshell housing a conventional reel 36 of strip material may be inserted, such as a 50-foot strip material reel on which, for example, film 37 is wound in a roll 38 with the inner end of the strip being connected to the core of the reel by any suitable means such as a clip member 39, which is disposed within slot 41 in the hub or core portion of the reel.

Although the cartridge is shown as being constructed in clamshell form, it may also be of the type described above with reference to U.S. Pat. Nos. 3,451,636, 3,467,340 and 3,480,226 wherein the reel is inserted into the cartridge chamber through an opening in one side wall of the cartridge; or may be constructed in two halves with the separation line lying in a plane perpendicular to the axis of the cartridge and in which the reel of strip material may be placed in one half of the cartridge on one of its chamber surfaces, and the other half of the cartridge placed over the opposite side of the reel. It will therefore be apreciated that the invention is not to be construed as being limited to a clamshell housing.

RAILS

The reel 36 is received loosely with the chamber of the cartridge 31 and the convolutions of strip material 37 are confined within the diameter of the reel flanges 42 by a pair of inwardly extending rails 43 in the upper and lower casing members, which rails are arranged to extend into close adjacency with the outer strip material convolutions, as may be particularly seen in FIGS. 2, 4 and 5. The rails confine the relative lateral movement of the reel to the central area of the cartridge chamber so as to facilitate assembly of the reel onto a spindle member of an apparatus, thereby preventing the reel flanges from coming into frictional contact with either wall surface of the cartridge chamber. The rails perform further and more significant guiding functions to be described later.

The two casing members 34, 35 of the cartridge 31 are provided with semi-circular openings 44 which together define circular holes at the opposite sides of the closed clamshell housing, which holes will be in generally coaxial relation to a grooved cylindrical hole 45 extending through the hub portion of the reel when the reel is located in the cartridge. The cartridge includes a tongue 48 and a depression 50 (FIGS. 1, 6, 7 and 11) that are adapted to cooperate with a rack (not shown) that is described in the previously mentioned pending "Cinematographic Cartridge Projector Apparatus" application.

The bottom wall of the lower casing member 34 is provided with an elongate slot 46 which defines end portions 46a, 46b that constitute entrance and exit openings for a stripper or pick-up mechanism of the apparatus on which the cartridge is to be loaded and for the drive mechanism of the apparatus, which end portions are linearly adjacent on either side of an intermediate portion that constitutes an exit opening for the strip material. The strip material passes through the widest or intermediate portion of the slot 46 that is shown at 47.

The pair of guide rails 43, although shown as being substantially continuous around the inside periphery of the cartridge chamber may also be intermittently spaced around the inside chamber periphery. In this manner when the cartridge with its received reel of strip material is loaded on an apparatus, the rails assure that the reel will be relatively confined to the central area of the cartridge and thus facilitate ease of assembly of the spindle member through the opening 45 in the reel.

Although the details of the particular apparatus on which the cartridge may be used are disclosed and described in the above-mentioned U.S. application Ser. No. 643,502, "Cinematographic Cartridge Projector Apparatus," the description of certain details of the apparatus will be briefly repeated herein so as to show the further utility and function of the guide rails 43 in the cartridge chamber.

In FIGS. 5, 6 and 7, the control assembly of the apparatus is shown generally at 56. It will be sufficient, for purposes of the description here, to say that such control assembly includes a movable roll driping mechanism 64 and a movable stripper or pick-up mechanism 65, as first disclosed in the aforementioned commonly assigned U.S. Pat. No. 3,429,518, and that both are suitably and selectively controlled for movement through openings in the cartridge into and out of engagement with the roll of strip material in the cartridge by mechanism described in the application mentioned in the preceding paragraph. The driving mechanism includes a resilient drive belt 148 of generally circular cross-section, e.g. a so-called "O-Ring," which is stretched around suitable belt guides, such as pulleys 149a, 149b and 149c, and projects beyond the upper edges of the side plates of the driving mechanism.

When the cartridge and its reel of strip material are in operation position on spindle 95 with the rotatable spindle head member 51 in reel driving engagement within reel opening 45, the cartridge being suitable held in fixed position on the apparatus will be spaced relative to the spindle member and to the reel so that the reel will thus be supported out of contact with the chamber wall surfaces of the cartridge.

When the strip material is to be moved out of the cartridge toward the automatic threading mechanism (not shown) of the apparatus, the pick-up and driving mechanisms 65, 64 are selectively moved into the cartridge, respectively through portions 46a, 46b of slot 46 into engagement with the outer convolution of strip material through the openings of slot 46 that are located at either side of the strip material exit or intermediate portion 47. As the pick-up and driving mechanism move into the cartridge they are guided into engagement with the roll of strip material by the guide rails 43 (as shown in FIGS. 8 and 9) as the mechanisms pass between the rails.

Since the normal tendency of coiled strip material is to clockspring, the guide rails 43 perform still another and important function of confining the clockspringing action of the strip material convolutions to the area within the diameter of the reel flanges (as seen, for example, in FIGS. 2 and 4). This confinement action becomes still more significant when it is appreciated that when the pick-up and driving mechanisms move into engagement with the strip material on one side of the roll, the roll may buckle or tend to become distorted on the opposite side of the roll, which result if permitted to occur may interfere with the effectiveness of the strip material feed-out action. The guide rails thus confine and minimize the effect and extent of such buckling or distortion.

There is a further cooperation of the guide rails with the pick-up and drive mechanism. The guide rails serve to guide the outer convolution of strip material as it is driven around the roll in clockwise manner, as viewed from FIG. 5, until the leading end of the strip material convolution is diverted from the roll periphery by the roll driving mechanism and the pointed end 174 of the pick-up mechanism to enter the channel that is formed between the one surface 175 (FIGS. 6, 7 and 12) of the pick-up mechanism on the one hand, and the drive surface or drive belt 148 of the driving mechanism and whereupon the leading end then passes out of the cartridge through the exit portion 47 of slot 46 to the automatic threading mechanism of the apparatus.

TANGENTIAL PATHS

The exit portion 47 is so spaced in the bottom of the cartridge with respect to the reel and its roll of strip material when the reel is mounted on a spindle member, and is of sufficient length along the circumference of the chamber peripheral wall surface so that the strip material will readily pass through the exit portion tangentially from the roll irrespective whether there are only a few feet of material wound around the reel or the full roll capacity of the reel is being utilized. In other words, the intermediate portion or exit portion 47 is so positioned as to lie within the range of the possible tangential paths that may be taken by the leading end of the outer convolution of strip material. This range is illustrated in FIG. 7 by the angle "A." The guide rails are tapered tangentially relative to the roll of strip material, as shown at 43a, with the end of such tangential taper being adjacent the strip material exit portion 47 of slot 46. The taper is toward the exit portion 47. When the roll of strip material is at its maximum capacity the taper serves to facilitate guiding the leading end of the strip material out of the cartridge.

ENCLOSED CHANNEL

Still another cooperation exists between the guide rails, and the pick-up and driving mechanisms is the formation of an enclosed channel between the apparatus and the cartridge mounted on the apparatus. When the two mechanisms extend through the openings in the cartridge and into engagement with the roll of strip material, an enclosed channel is formed between the pick-up and driving mechanisms on the one hand, and the cartridge on the other hand with the result that the strip material is reliably enclosed and moved out of the cartridge directly to automatic threading mechanism (not shown) of the apparatus. As illustrated in FIG. 12, one surface of the driving mechanism belt 148 presents a plane Y-Y' to one side of the roll having an angle "B" that is greater than 90° with respect to the point "P" along the guide rails at which the belt initially passes through the rails into the chamber, and greater than the angle of the plane X-X' that passes through the center of the roll of strip material and point "P." In other words, striking a perpendicular line Z-Z' through point "P" and with respect to plane X-X', the angle "B" formed by YPZ is greater than the angle formed by XPZ. This construction will hold true no matter whether the roll of strip material is at a maximum capacity, as illustrated at FIG. 6, or is considerably less than the maximum capacity, as illustrated at FIGS. 7 and 12.

In this manner of roll driving mechanism arrangement relative to the rails, therefore, a locking angle, which might otherwise result at point "P" if the blet surface presented a plane that formed an angle B of substantially 90° or less, thereby stopping the leader and causing it to jam, is avoided. As a consequence of this arrangement, if the leader of the strip material should clockspring radially from the roll as far as to the rails, shown in the solid line position of 37 in FIG. 12, then the one surface of the driving mechanism, upon being contacted by the end of the leader when the roll is rotated by the driving mechanism, will walk the leader end over to the roll, as shown in successive dotted line positions 37', 37" and 37''', whereupon the leader end will be diverted by the finger 174 of the pick-up mechanism 65 into the enclosed channel formed by the pick-up mechanism and the driving belt mechanism with the cartridge for subsequent movement out of the cartridge.

It should be further appreciated that the rail means 43 need be in pairs only in the area of the cartridge chamber of the pick-up and drive mechanism entry openings and strip material exit portion, while the rail means may be a single or solid annular member around the remaining periphery of the cartridge chamber. Also, as heretofore mentioned, the rail means may be intermittently and suitably spaced about the periphery of the chamber.

TACTILE DISCONTINUITY

A tactile discontinuity in the form of a notch 300 formed by the removal of material may be provided at a suitable predetermined location in the external surface of the cartridge, and may serve to indicate by its presence or absence in the cartridge an informational characteristic contained on said strip material, for example, whether the strip material in the cartridge contains a sound track, such as an optical one or magnetic striping. The notch 300 is illustrated in FIG. 1 as cooperating with a detector finger 302 of the apparatus. The details of the detector finger operation are described in the previously mentioned pending "Cinematographic Cartridge Projector Apparatus" application.

The invention has been described in detail with particular reference to a preferred embodiment thereof, but it will be understood that variations and modifications can be effected within the spirit and scope of the invention.

I claim:

1. A cartridge adapted for use with an apparatus, the cartridge having a wall surface defining a chamber adapted to receive therein a reel having two spaced flanges and containing a roll of strip material to be operably used in the apparatus, said cartridge having in its chamber rail means that extend from the wall surface defining the chamber, the rail means being adapted to project within and between the two flanges of said reel to confine the reel within a predetermined area of the cartridge, and to confine the strip material within the diameter of the reel flanges and thereby minimize the extent of clockspringing of the material, the wall surface of said chamber defining an elongated opening through which a strip material pick-up and a roll driving mechanism of the apparatus are adapted to extend, and said rail means in the area of said opening comprising a pair of rails between which said opening is located.

2. In apparatus for use with a cartridge having means defining a chamber for a roll of strip material and having means defining an opening into the chamber through which strip material can pass out of and into the cartridge, the roll of strip material having a leading end which preceeds other portions of the strip material in passing out of the cartridge, the improvement comprising strip material pick-up means, a roll driving mechanism, said pick-up means and said mechanism being movable so as to extend through said opening and into said chamber opening of said cartridge and into engagement with said roll to form with the chamber an enclosed channel through which the leading end of said strip material is moved out of the cartridge to the apparatus, said cartridge having in its chamber rail means spaced radially from said roll of strip material, said roll driving mechanism presenting to one side of said roll a moving planar surface adapted to be contacted by the leading end of said strip material and adapted to move said leading end away from said rail means toward said roll and into said enclosed channel when the roll is engaged and rotated by said driving mechanism, said planar surface forming an angle with the rail means at the point along said rail means at which said driving mechanism initially enters the chamber, said angle being greater than an angle formed with the rail means by a plane passing through the same said point and the center of said roll.

3. A cartridge as defined in claim 1, and wherein a tactile discontinuity indicative of an informational characteristic contained on said strip material is provided at a predetermined location in the external surface of said cartridge.

4. A cartridge as defined in claim 1, and wherein said elongated opening comprises an intermediate portion and end portions that are linearly adjacent either end of said intermediate portion;

said intermediate portion being of greater width than the two adjacent end portions, and further being so located in the chamber wall and of sufficient length as to lie within the range of possible tangential paths that may be taken by the leading end of the outer convolution of strip material.

5. A cartridge as defined in claim 4, and wherein said rails adjacent one end of said intermediate portion of said opening are tapered tangentially toward said opening with respect to the roll of strip material when the latter is in said cartridge to facilitate guiding the strip material out of said cartridge.

6. Apparatus for removing from a cartridge a length of strip material from a roll of such material supported within the cartridge, the cartridge having means including a peripheral surface defining a chamber in which rolls of strip material of various sizes are adapted to be received, and the cartridge having an opening through which strip material in the chamber is adapted to pass as it is removed from the cartridge, the roll being supported within the cartridge for rotation of the roll in a direction for unwinding strip material from the roll, said apparatus comprising:

a pick-up member having first and second portions;

means mounting said member for movement of said first portion into and out of engagement with the roll of strip material to deflect the leading end of the material from the roll during rotation of the roll in an unwinding direction, said second portion being positioned to form part of a guide for strip material removed from the roll when said first portion of said pick-up member is in engagement with the roll;

and endless drive belt;

means for supporting said belt for movement into and out of engagement with the roll;

said belt having first and second substantially straight portions disposed at an angle with respect to each other, the first belt portion being located relative to the pick-up member when the belt is in engagement with the roll so that the first belt portion forms a second part of said guide for strip material, the second belt portion being positioned with respect to the roll when the belt is in engagement with the roll so that said second belt portion is engageable by the leading end of the strip material during rotation of the roll in a direction for unwinding material from the roll, said second belt portion being sufficiently long to extend from adjacent said roll of strip material substantially to the peripheral surface of the cartridge even when the roll in the cartridge chamber is substantially smaller than the maximum size roll that can be accommodated in the chamber; and means for driving said belt in a direction to cause rotation of the roll in a direction for unwinding material from the roll when the belt is in engagement with the roll, whereby during movement of said belt to drive the roll in its unwinding direction, the leading end of the strip material if separated from the roll is engageable with the second belt portion to permit said second belt portion to move the leading end of the strip material away from the peripheral surface of the cartridge and toward said first belt portion for delivery of the leading end of the strip material into said guide formed by said belt and said pick-up member.

7. In a mechanism for removing a length of strip material from a roll of such material rotatably supported within a carriage having a pehipheral surface for guiding the strip material and an opening through which the strip material can be withdrawn from the cartridge, the roll being rotatable about an axis and the strip material having a leading end which tends to separate and move away from the roll during rotation of the roll in an unwinding direction, the improvement comprising:

an endless drive belt comprising part of said removing mechanism, means including three pulleys movably supporting said belt so that said belt is movable through a generally triangular path and has two substantially straight portions angularly disposed with respect to each other;

means for mounting said belt for movement between a first position outside the cartridge and a second position wherein said belt is engageable with the roll and wherein said belt is at least partially positioned within the cartridge; and means for driving the belt in a direction to effect movement of the roll in an unwinding direction, one of said straight belt portions extending from the roll substantially to the peripheral surface of the cartridge when the belt is in its second position so that in the event the leading end of the roll separates from the roll, said leading end will engage said one belt portion and be moved thereby in a direction generally radially inwardly of the roll when the belt is driven to move the roll in the unwinding direction, thereby feeding the leading end toward said second belt portion.

8. In a mechanism for removing a length of strip material from a roll of such material as set forth in claim 7 wherein said means for mounting said belt locates said one belt portion relative to the axis of rotation of the roll of material when the belt is in its second position so that said one belt portion is in a plane passing between the axis of rotation of the roll and the opening in the cartridge.

9. A mechanism for removing a length of strip material from a roll of such material, the strip material being rotatable about an axis and having a leading end which tends to separate from the roll and move away from said axis during rotation of the roll in an unwinding direction, said mechanism comprising:
   an endless drive belt movable into engagement with the roll for rotating the roll about its axis in the unwinding direction,
   means comprising at least three spaced belt guide members for movably supporting said belt so that said belt has at least three substantially straight portions, said belt portions comprising first and second portions disposed at an angle with respect to each other, said second portion extending from the roll to be engageable by the leading end of the strip material during rotation of the roll in a direction for unwinding material from the roll;
   means for mounting said belt so that said second portion moves in a direction toward the roll and so that said first portion moves in a direction away from the roll when said belt is in engagement with and rotating the roll in the unwinding direction; and
   means for driving said belt over said guide members in a direction to cause rotation of the roll about its axis in a direction for unwinding material from the roll when the belt is in engagement with the roll whereby during movement of said belt to drive the roll in its unwinding direction, the leading end of the strip material is engageable with the second belt portion to permit said second belt portion to move the leading end of the strip material toward said axis and said first belt portion.

10. An apparatus for removing a length of thin strip material from a roll of such material rotatably supported within an enclosure having an opening through which strip material can be withdrawn, the strip material being rotatable within the enclosure about an axis and having a leading end which tends to separate from the roll and move away from said axis during rotation of the roll in an unwinding direction, said apparatus comprising:
   a stripping member having a portion engageable with the roll for deflecting the leading end of the length of strip material when the roll is rotated in the unwinding direction;
   an endless drive belt;
   means for movably supporting said drive belt comprising at least three pulleys located with respect to each other so that the belt has at least three substantially straight portions including first and second portions angularly disposed with respect to each other;
   means for positioning said drive belt supporting means and said belt into and out of such an enclosure through the opening of the enclosure so that (1) said first belt portion frictionally engages and extends from the roll when said belt is positioned within the enclosure and (2) said second belt portion extends from the roll for a predetermined distance related to the distance which the leading end tends to move away from the roll during rotation of the roll in an unwinding direction; and
   means for driving said belt when said belt is positioned in the enclosure (1) to effect movement of said first belt portion relative to said supporting means in a direction to rotate the roll in a strip material unwinding direction and to guide the leading end away from the roll and through the opening after the leading end passes between said first belt portion and the roll during rotation of the roll and (2) to effect movement of said second belt portion relative to said support means toward the roll whereby said second belt portion is effective to be engaged by and to move the leading end of the strip material toward the roll if it becomes separated from the roll prior to passing between said first belt portion and the roll.

References Cited

UNITED STATES PATENTS

| | | | |
|---|---|---|---|
| 2,891,736 | 6/1959 | Blaes. | |
| 3,150,840 | 9/1964 | Briskin et al. | 242—55.13 |
| 3,231,081 | 1/1966 | Elterman | 206—52 |
| 3,254,856 | 6/1966 | Camras | 242—55.13 |
| 3,149,797 | 9/1964 | Pastor et al. | 242—55.13 |
| 3,429,518 | 2/1969 | McKee. | |

GEORGE F. MAUTZ, Primary Examiner

U.S. Cl. X.R.
242—195, 197

PO-1050
(5/69)

UNITED STATES PATENT OFFICE
CERTIFICATE OF CORRECTION

Patent No. 3,536,276          Dated October 27, 1970

Inventor(s) John J. Bundschuh and Kenneth W. Thomson

It is certified that error appears in the above-identified patent and that said Letters Patent are hereby corrected as shown below:

Column 3, line 12, cancel "withi" and insert --with--; line 34, after "of" insert --part of--; and line 59, cancel "elevation" and insert --elevational--. Column 4, line 18, cancel "apreciated" and insert --appreciated--. Column 5, line 4, cancel "driping" and insert --driving--; line 21, cancel "suitable" and insert --suitably--; and line 34, cancel "mechanism" and insert --mechanisms--. Column 6, line 44, cancel "blet" and insert --belt--. Column 7, line 38, after "chamber" delete "opening"; and line 40 after "chamber" insert --opening--. Column 8, line 22, cancel "and" and insert --an--. Column 9, line 54, delete "An apparatus" and insert --Apparatus--.

SIGNED AND
SEALED

January 26, 1971

(SEAL)
Attest:

Edward M. Fletcher, Jr.
Attesting Officer

WILLIAM E. SCHUYLER, JR.
Commissioner of Patents